United States Patent
Sun

(10) Patent No.: US 8,014,294 B2
(45) Date of Patent: Sep. 6, 2011

(54) SYSTEM, APPARATUS AND METHOD FOR DEVICES TRACING

(75) Inventor: Tongjiang Sun, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 302 days.

(21) Appl. No.: 12/345,528

(22) Filed: Dec. 29, 2008

(65) Prior Publication Data

US 2009/0141642 A1  Jun. 4, 2009

Related U.S. Application Data

(63) Continuation of application No. PCT/CN2008/070033, filed on Jan. 7, 2008.

(30) Foreign Application Priority Data

Mar. 14, 2007  (CN) .............. 2007 1 0064411

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ....................................... 370/241; 370/252

(58) Field of Classification Search .......... 370/241–245, 370/252
See application file for complete search history.

(56) References Cited

U.S. PATENT DOCUMENTS

| | | | |
|---|---|---|---|
| 2005/0071457 A1 | 3/2005 | Yang-Huffman et al. | |
| 2005/0180335 A1* | 8/2005 | Lee | 370/252 |
| 2006/0031573 A1 | 2/2006 | Feutz et al. | |
| 2006/0114838 A1 | 6/2006 | Mandavilli et al. | |
| 2007/0070969 A1* | 3/2007 | Malomsoky et al. | 370/345 |

FOREIGN PATENT DOCUMENTS

CN  1535016 A  10/2004
(Continued)

OTHER PUBLICATIONS

Office Action issued in corresponding Chinese Patent Application No. 200710064411.7; Issued Jun. 20, 2008.

(Continued)

*Primary Examiner* — Xavier Szewai Wong
(74) *Attorney, Agent, or Firm* — Brinks Hofer Gilson & Lione

(57) ABSTRACT

A system for devices tracing includes multiple devices that are connected in a network, a configuration management module, and a tracing management module. The configuration management module is adapted to store and maintain tracing configuration information. The tracing management module is adapted to obtain the tracing configuration information, determine different devices involved in the tracing task, send tracing control commands to each of the different devices, receive the tracing messages from the each of the different devices, and perform cross-NE tracing. A method for devices tracing includes: receiving tracing task information, and determining different devices involved in a tracing task according to the tracing task information; sending a command for creating a tracing task to each of the different devices; receiving tracing messages reported by the each of the different devices, and obtaining tracing results. Embodiments of the present invention may support tracing multiple devices concurrently and support cross-NE tracing, thus achieving unified tracing.

15 Claims, 4 Drawing Sheets

FOREIGN PATENT DOCUMENTS

| | | |
|---|---|---|
| CN | 1756183 | 4/2006 |
| CN | 1859165 | 11/2006 |
| CN | 1866869 | 11/2006 |
| CN | 101026501 | 8/2007 |
| JP | 2006067078 | 3/2006 |
| WO | 00/11902 | 3/2000 |
| WO | 03/085543 A1 | 10/2003 |

OTHER PUBLICATIONS

Written Opinion of the International Searching Authority Issued in corresponding PCT Application No. PCT/CN2008/070033; mailed Apr. 17, 2008.

Office Action issued in corresponding European Patent Application No. 08 700 059.2; dated Sep. 25, 2009.

* cited by examiner

SYSTEM, APPARATUS AND METHOD FOR DEVICES TRACING

CROSS-REFERENCE TO RELATED APPLICATIONS

This application is a continuation of International Application No. PCT/CN2008/070033 filed on Jan. 7, 2008, which claims priority to Chinese Patent Application No. 200710064411.7, filed with the Chinese Patent Office on Mar. 14, 2007, both of which are hereby incorporated by reference in their entireties.

FIELD OF THE INVENTION

The present invention relates to the field of device management technologies, and in particular, to a system, method and apparatus for devices tracing.

BACKGROUND OF THE INVENTION

Various hardware and software systems are distributed in a large network system, each providing local management and maintenance tools. These management tools facilitate the local maintenance by network administrators. A tracing tool is an important network management and maintenance tool. Tracing is a process of inspecting messages that are received and sent between devices or inside a device. Tracing is an important means of network device maintenance, through which device failures may be located, user complaints may be handled, and service processes may be tested. Tracing focuses on data flows or protocol flows between devices or between signaling protocols. Compared with a log, tracing has the following features: real-time, able to reflect a service data process visually, and able to locate problems quickly.

Tracing is categorized into user tracing, interface tracing and service tracing.

User tracing is to observe locations and states of a user and message interaction relations and contents in each state according to the unique ID of the user, for example, Mobile Station International ISDN Number (MSISDN), IP address, account and employee ID. Call tracing belongs to user tracing.

Interface tracing is to trace the message receiving and sending based on various protocol interfaces. The foregoing protocols may be standard protocols in the industry or internal protocols defined by a device provider.

Service tracing is to trace the whole service process, including service information flows or control flows between different devices or network elements (NEs, also referred to as modules) in a telecom network or a computer network.

However, most of existing tracing technologies are targeted at a single device, that is, tracing tools developed for devices can only trace the devices respectively. Most of the tracing tools support only one tracing type, and the supported tracing protocols are limited by the devices, making it difficult to perform cross-NE tracing and end-to-end locating. Thus, when a service failure occurs, the troubleshooting efficiency is low.

SUMMARY OF THE INVENTION

Embodiments of the present invention provide a tracing technology that can perform cross-NE tracing without limiting the tracing type so that all the devices in a network can be traced via a same system.

A system for devices tracing provided in an embodiment of the present invention includes multiple devices that are connected in a network, a tracing management module that is connected to the multiple devices, and a configuration management module that is connected to the tracing management module, where:

the configuration management module is adapted to store and maintain tracing configuration information, which describes different devices involved in a tracing task; and the tracing management module is adapted to obtain the tracing configuration information, determine different devices involved in the tracing task, send tracing control commands to each of the different devices, receive tracing messages from each of the different devices, and perform cross-NE tracing.

An apparatus for devices tracing provided in an embodiment of the present invention includes:

a task analysis module, adapted to obtain a tracing task and determine different devices involved in the tracing task;

a command sending module, adapted to send tracing control commands to each of the different devices involved in the tracing task; and a message receiving module, adapted to receive tracing messages reported by each of the different devices.

A method for devices tracing provided in an embodiment of the present invention includes:

receiving tracing task information, and determining different devices involved in a tracing task according to the tracing task information;

sending a command for creating a tracing task to each of the different devices; and receiving tracing messages reported by each of the different devices, and obtaining tracing results.

Embodiments of the Present Invention Have the Following Merits:

In the embodiments of the present invention, a configuration management module stores and maintains tracing configuration information, and a tracing management module calls the configuration management module to trace devices involved in a tracing task. Therefore, embodiments of the present invention may support tracing multiple devices concurrently, i.e. and support cross-NE tracing, thus achieving unified tracing.

The following describes the technical scheme of the present invention in detail with reference to embodiments and accompanying drawings.

DETAILED DESCRIPTION OF THE EMBODIMENTS

Figure 1:
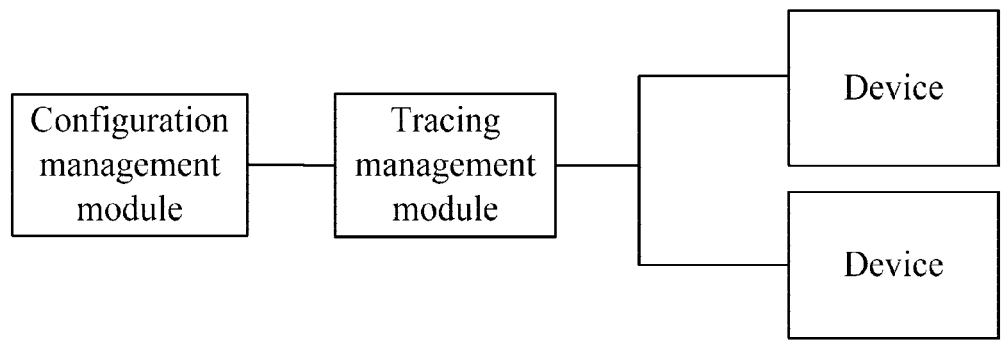
FIG. 1 shows a structure of a system for devices tracing according to a first embodiment of the present invention.

First Embodiment of the System for Devices Tracing:

A system for devices tracing is established, as shown in FIG. 1. The system includes multiple devices that are connected in a network, a configuration management module, and a tracing management module. The foregoing modules may be implemented by hardware or software. The configuration management module is adapted to store and maintain tracing configuration information, which describes different devices involved in a tracing task. The tracing management module is adapted to obtain the tracing configuration information, determine different devices involved in the tracing task, send tracing control commands to each of the different devices, and receive tracing messages from each of the different devices.

The tracing configuration information that the configuration management module stores and maintains is description information files provided and configured by each device, including available tracing functions, specific device type and tracing parameter information that the devices support. The configuration management module loads the files provided by each device and the system configuration parameter information of the system for devices tracing when the system is started. In the first embodiment, the configuration management module stores the tracing configuration information by using a unified template for device information description files. In other words, the configuration management module stores and maintains the tracing configuration information sent from different devices in a network on a unified basis. Thus, the system may support tracing multiple devices concurrently.

The tracing configuration information may further include NE information, service information and process information. The configuration management module may store and maintain the further included information. The service information defines the NEs and module types involved in a service. The process information may be defined and stored in a template, and the process information defines a standard process for a service or NE. The standard process is used for comparison during the tracing process. The service information and process information may be defined in a configuration management interface or provided in a file. Therefore, the first embodiment of the present invention may implement cross-NE tracing and process tracing.

The tracing management module is a main control module in the first embodiment. The tracing management module is adapted to send tracing control commands to devices, and receive tracing messages from devices so as to manage tracing tasks and tracing results. The tracing management module may also have the following functions: creating a tracing task, activating/deactivating a tracing task, querying a tracing task, deleting a tracing task, and storing/opening a tracing result file.

In the first embodiment of the present invention, the configuration management module stores and maintains the tracing configuration information; the tracing management module obtains the tracing configuration information from the configuration management module; and different devices involved in a tracing task are traced according to the actual condition of the tracing task. Therefore, the first embodiment of the invention may support tracing multiple devices concurrently and support cross-NE tracing, thus achieving unified tracing.

Figure 2:
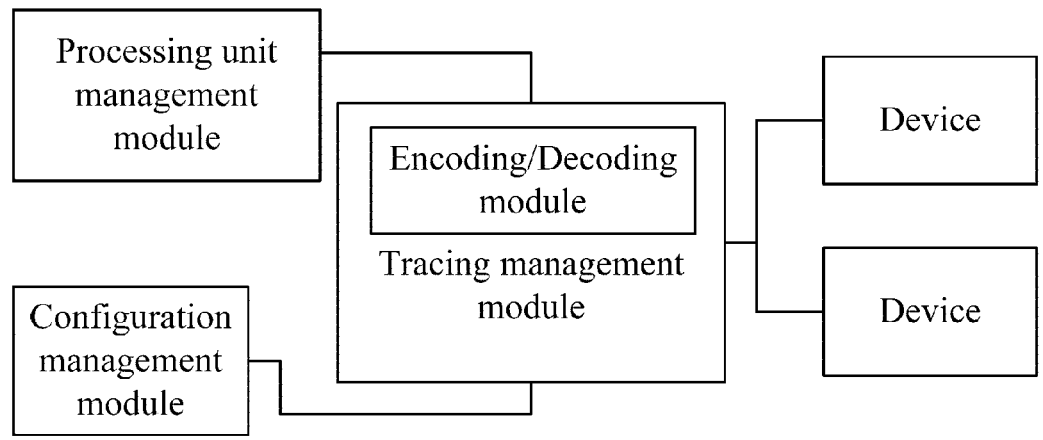
FIG. 2 shows a structure of a system for devices tracing according to a second embodiment of the present invention.

Second Embodiment of the System for Devices Tracing:

Based on the first embodiment of the system for devices tracing, the system provided in the second embodiment further includes a processing unit management module, as shown in FIG. 2. The processing unit management module is adapted to store the processing unit of each device, and encode tracing commands and parse tracing messages by using the processing unit according to call commands of the tracing management module. The tracing management module further includes an encoding/decoding module, which is adapted to call the processing unit management module to encode tracing control commands of each device and parse the tracing messages.

In the second embodiment of the system for devices tracing, different processing units are adapted to match different devices, and these processing units are stored in the processing unit management module. When tracing is executed, the system calls a processing unit according to a device to encode tracing commands and parse tracing messages. In the second embodiment of the system for devices tracing, processing units are implemented by plug-in, therefore match different devices by using the plug-in mechanism. That is, the system for devices tracing defines unified tracing plug-in interfaces, including interfaces for logging in to a device, creating a tracing task, deleting a tracing task, and parsing reported messages. These messages are stored in the processing unit management module as plug-in. Each device implements a respective protocol stack in the respective processing unit (the plug-in unit in this embodiment). Thus, the system for devices tracing provided in an embodiment of the present invention may encode/decode messages over different protocols for different devices. That is, the system for devices tracing provided in an embodiment of the invention may support different tracing protocols and is not limited to the traced devices.

In the second embodiment of the system for devices tracing, when receiving a tracing control command, the tracing management module obtains the tracing configuration information from the configuration management module, and analyzes the tracing control command to determine different devices involved in the tracing task. Afterwards, the encoding/decoding module in the tracing management module calls a relevant interface (as an interface of plug-in) of a processing unit in the processing unit management module to encode various tracing commands, and send the encoded commands to the devices. When the tracing management module receives tracing messages that are reported by the devices, the encoding/decoding module in the tracing management module calls a relevant interface (as an interface of plug-in) of a processing unit in the processing unit management module to parse tracing messages in different formats, and store the parsed messages in a unified data structure model that is defined in the second embodiment of the system for devices tracing. The foregoing process completes the tracing on each device involved in a tracing task.

According to the foregoing description, because the system for devices tracing provided in an embodiment of the invention provides a unified tracing framework, when the system needs to trace a new device that is connected to the network, the device requires only simple secondary development, and the device tracing and maintenance can be performed after a device description file and a corresponding processing unit (plug-in) are provided.

Third Embodiment of the System for Devices Tracing:

Based on the second embodiment of the system for devices tracing, the system provided in the third embodiment may further include a message analysis module. The message analysis module is adapted to obtain device failure causes according to tracing messages from the tracing management module. The message analysis module performs process analysis and message level analysis on the received tracing messages to fast locate failures and find out failure causes. After receiving the tracing messages, the message analysis module compares the received tracing messages with the standard process information to locate failures and find out failure causes.

To facilitate a user to view results and perform man-machine interactions, the system provided in the third embodiment may further include an interface presentation module. The interface presentation module is adapted to receive user commands, query the tracing configuration information according to the received user commands, call the processing unit management module, display a customizing interface, send the received tracing type setting commands and tracing condition information to the tracing management module, and display the device failure causes from the message analysis module in the interface of a user terminal. That is, the interface presentation module interacts with the user, responds to the user commands, provides a general tracing condition setting interface and a unified result presentation interface, and sends the received tracing type setting commands and tracing condition information to the configuration management module. The tracing management module may send tracing commands to devices involved in a tracing task according to tracing types and tracing conditions specified by the user. Thus, the third embodiment may support different types of tracing tasks.

In the system for devices tracing that includes an interface presentation module, because different devices may have different interface requirements, a unified interface processing unit interface may be defined besides the general tracing condition setting interface. Different interface processing units (iplug-ins) may be used to meet different interface requirements of different devices. Thus, in this embodiment, the system for devices tracing may further include an interface processing unit. The interface processing unit is adapted to display interfaces according to call commands from the interface presentation module. The interface processing unit may include interface information that can be customized by a device. The interface information is provided by a device to the processing unit management module in the plug-in mode, and is used by the system. The processing unit management module manages these interface plug-ins, calls the plug-ins, provides the interface presentation module with interfaces, and displays a customizing interface. The user provides tracing type setting commands and tracing condition information according to the customizing interface.

In addition, because the system for devices tracing includes an interface presentation module that is adapted to display the interface, visual display effects of tracing results may be added to the message analysis module. After receiving tracing messages, the message analysis module compares the received tracing messages with the tracing task process template, and marks abnormal information that does not comply with the standard process by using warning colors, thus helping the user to locate problems quickly. The message analysis module may also analyze the level of tracing messages, and mark alarm and error messages with different colors to remind the user. After the message analysis module analyzes messages, the tracing management module notifies the interface presentation module of displaying the messages. The messages may also be displayed with visual effects of tracing results. Thus, the user may determine the locations of possible failures and possible faulty devices in the task process according to the information displayed on the user terminal. This improves the troubleshooting efficiency in the case of service failures.

Embodiment of the Apparatus for Devices Tracing:

An embodiment of the present invention provides an apparatus for devices tracing that are applicable to the foregoing system. The apparatus includes a task analysis module, a command sending module and a message receiving module. The task analysis module is adapted to obtain tracing task information and determine different devices involved in the tracing task. The command sending module is adapted to send tracing control commands to each device involved in the tracing task. The message receiving module is adapted to receive tracing messages reported by each device.

The apparatus in this embodiment may further include an encoding/decoding module, adapted to call a processing unit that corresponds to a device involved in a tracing task to encode tracing control commands or decode tracing messages.

After obtaining a tracing task, the task analysis module sends tracing commands according to actual conditions of the tracing task, receives tracing messages, and traces different devices involved in the tracing task. Therefore, this embodiment of the present invention may support tracing multiple devices concurrently and support cross-NE tracing, thus achieving unified tracing. In addition, encoding and decoding based on different devices further improve the compatibility of this embodiment.

Figure 4:
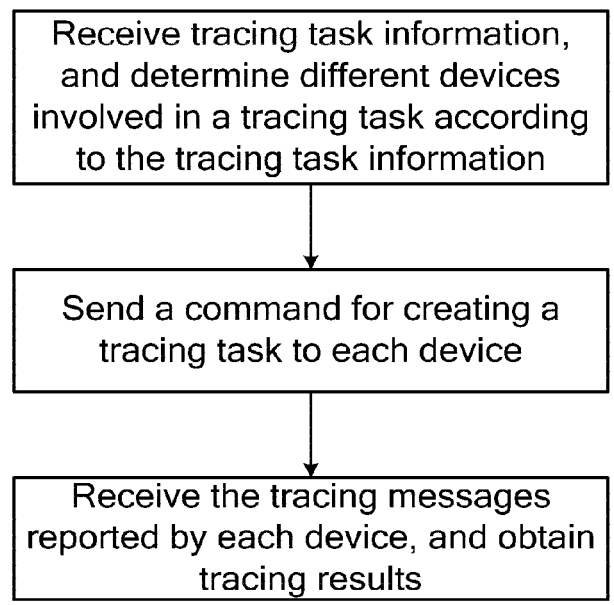
FIG. 4 is a flowchart of a method for devices tracing according to an embodiment of the present invention.

First Embodiment of the Method for Devices Tracing:

As shown in FIG. 4, the embodiment of the method for devices tracing is based on the foregoing embodiments of the system for devices tracing, and includes the following steps:

receiving tracing task information and determining different devices involved in a tracing task according to the tracing task information;

sending a command for creating a tracing task to each device; and receiving tracing messages reported by each device, and obtaining tracing results.

Because each device involved in a tracing task may have different tracing protocols, the command for creating a tracing task in some tracing protocols needs to be encoded. In addition, encoding modes may vary with protocols. Under the foregoing condition, the command for creating a tracing task of each device may be encoded according to the tracing task information, and then the encoded command for creating a tracing task is sent to each device.

Similarly, tracing messages that are reported by each device may be encoded by each device according to tracing protocols. Thus, after the tracing messages are reported by each device, the tracing messages need to be parsed to obtain tracing results.

Figure 5:
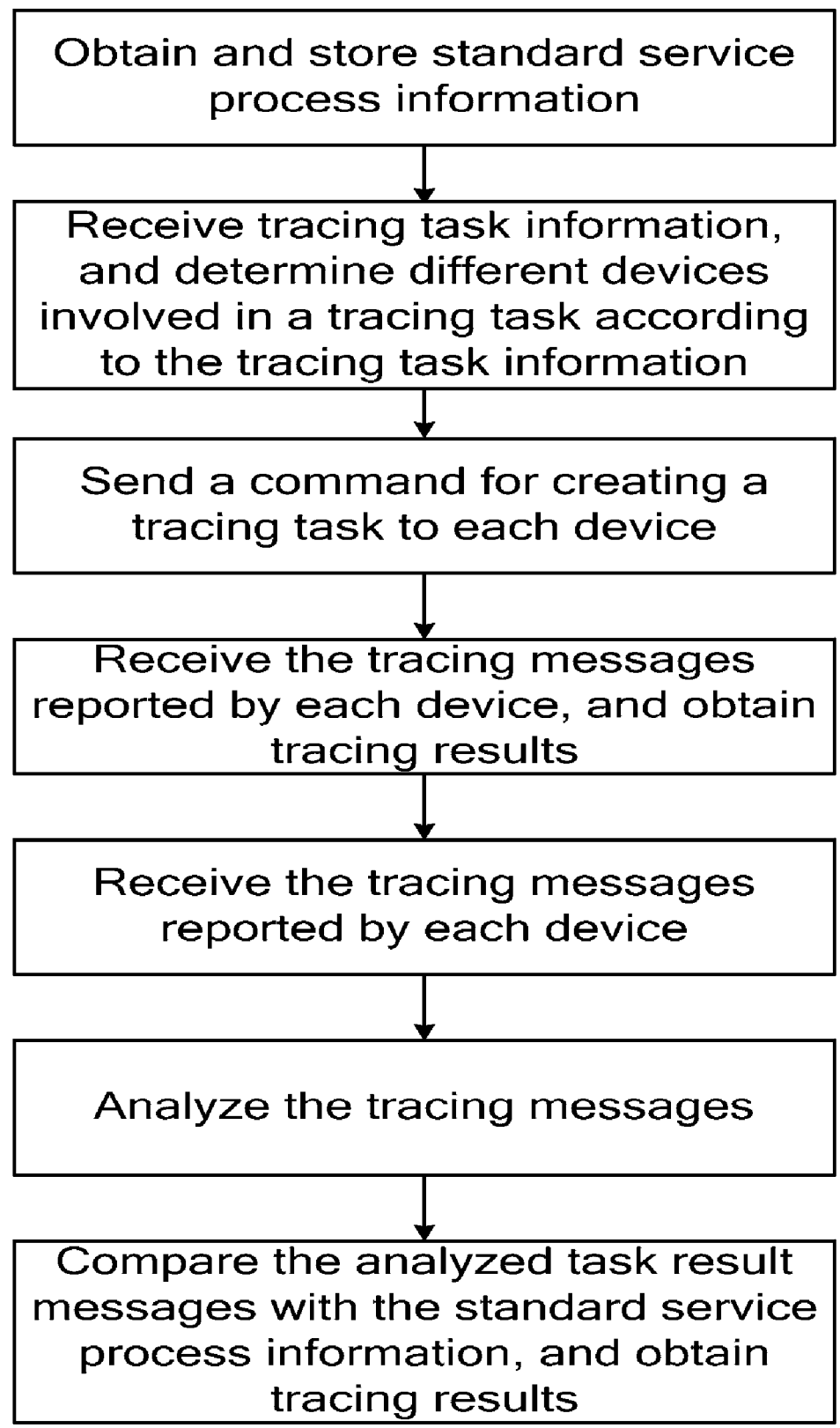
FIG. 5 is a flowchart of a method for tracing according to another embodiment of the present invention.

Second Embodiment of the Method for Devices Tracing:

As shown in FIG. 5, based on the first embodiment of the method for devices tracing, the method may include the following step before the step of analyzing different devices involved in a tracing task:

obtaining and storing the standard service process information.

The foregoing standard service process information provides a standard process for services and/or service devices. The process may involve multiple devices. The user may define the standard service process information in a template by using the configuration management module provided in an embodiment of the present invention. The user may also provide the standard service process information in the form of a template file to the system, and store the template file in the configuration management module.

Because the foregoing service process template provides a standard service execution process, the system only needs to compare the service process with the actual process that is obtained on the basis of analysis of tracing messages to locate failures and obtain tracing results. Therefore, the step of receiving the tracing messages that are reported by each device and obtaining the tracing results includes:

receiving the tracing messages that are reported by each of the different devices;

analyzing the tracing messages; and comparing the analyzed task result messages with the standard service process information, and obtaining the tracing results.

Figure 6:
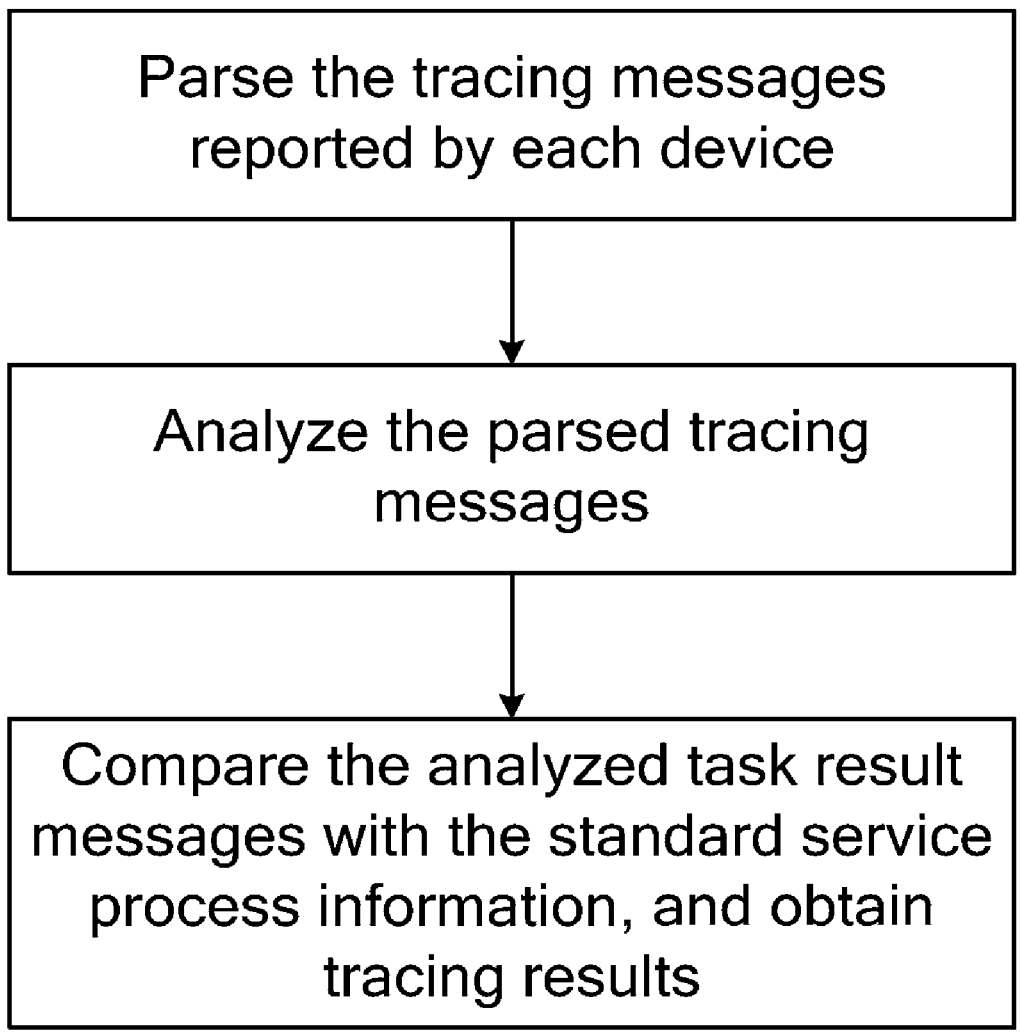
FIG. 6 is a flowchart of obtaining a tracing result obtained by using the method for tracing according to another embodiment of the present invention.

In fact, the tracing messages that are reported by each device may be parsed. Therefore, as shown in FIG. 6, the step of receiving the tracing messages that are reported by each device and obtaining the tracing results may include:

parsing the tracing messages that are reported by each of the different devices;

analyzing the parsed tracing messages; and comparing the analyzed task result messages with the standard service process information, and obtaining the tracing results.

To make the method for devices tracing provided in an embodiment of the invention more flexible, the user may specify the information to be obtained according to the conditions of different devices involved in the process so as to obtain visual tracing results, remove unnecessary redundant information, and improve the tracing efficiency. Thus, the following steps may be executed, before the step of receiving the tracing task information and determining different devices involved in a tracing task according to the tracing task information:

receiving tracing type setting commands and tracing condition information; and determining the tracing task information according to the tracing type setting commands and the tracing condition information.

Because a tracing task may involve different devices, especially different types of devices, the user needs to set tracing types and tracing conditions for different devices by using commands. To provide a better interactive interface between the user and the system, it is necessary to display different interfaces according to different devices involved in the tracing task. Thus, the following step may be executed before the step of receiving the tracing type setting commands and tracing condition information from the user terminal: displaying the tracing type setting and/or tracing condition information customizing interface, and receiving the tracing type setting commands and tracing condition information through the interface.

The interface processing unit in the processing unit management module may be called to perform the foregoing step. The interface processing unit may be implemented in the plug-in mode.

After obtaining the tracing results, the system may also display the tracing results. That is, the following steps may be executed after the step of receiving the tracing messages that are reported by each device and obtaining the tracing results:

displaying the tracing results; and deleting a tracing task according to a tracing task deletion command.

The system displays the tracing results on the screen of the user terminal through the interface presentation module. The tracing result presentation interface is divided into a graph display area, a text display area, a table display area, a tree-type display area, and a code stream display area. The tracing result presentation interface shows the tracing results in different forms. The graph display area shows the tracing results in the form of a flowchart, showing the whole message process visually. The table display area shows the public information of the tracing results, including reporting time, sender, receiver, level and brief description of the messages. The tree-type display area shows the detailed information of messages in a tree. The code stream display area shows original code streams of tracing messages. If the reported tracing messages are in the text format, the tracing messages may be viewed and edited directly in the text area.

The user may locate failures after viewing the foregoing results, and send a task deletion command through a task deletion interface of the system to delete the tracing task. After deleting the tracing task, the system may also return a message to the user.

FIG. 4 shows a specific process of the foregoing embodiment.

Figure 3:
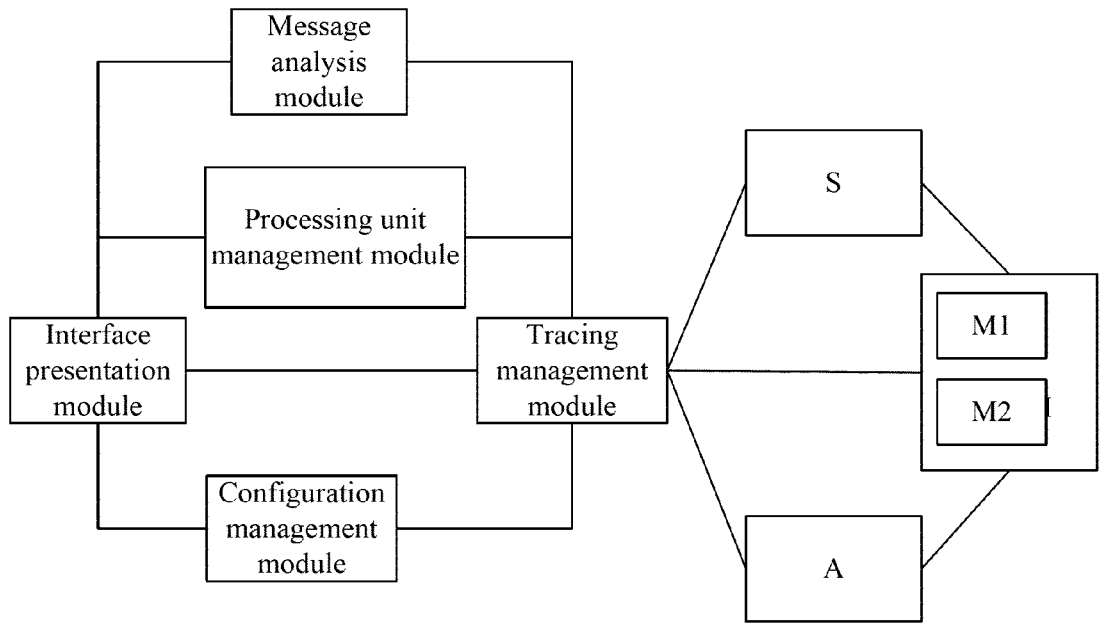
FIG. 3 shows a structure of a system for devices tracing according to a third embodiment of the present invention.

A specific process of the embodiment of the method for devices tracing is hereunder illustrated by using a video on demand (VOD) service that involves three NEs (i.e., devices in the network): S, M and A shown in FIG. 3. NE S may be a service gateway, NE M may be a streaming server (namely, VOD server), and NE A may be a charging server. NE M further includes an M1 module and an M2 module. The following describes how the system for devices tracing provided in an embodiment of the invention performs tracing and locating in the case of service failures, taking the VOD service of NE S as an example.

Before a tracing task is created, normal scenarios for the VOD service are as follows:

(1) NE S receives a VOD request from a user, and sends the request message to the M1 module of NE M.

(2) After receiving the request, the M1 module sends a notification message to the M2 module.

(3) The M2 module processes VOD internally.

(4) After the internal processing is complete, the M2 module sends a notification message to NE A.

(5) After receiving the notification message, NE A performs internal processing, and returns a response to the M2 module.

(6) After receiving the response, the M2 module returns a response message to the M1 module.

(7) The M1 module returns a message to NE S.

After a tracing task is created for each device, each device turns on the tracing switch, and reports tracing messages meeting conditions to the tracing management module. Normally, scenarios where the VOD service is traced are as follows:

(1) After sending a request message to the M1 module, NE S reports a tracing message;

(2) The M1 module sends a notification message to the M2 module, and reports a tracing message;

(3) The M2 module performs internal processing, and reports a tracing message;

(4) The M2 module sends a message to NE A, and reports a tracing message;

(5) NE A returns a response to the M2 module, and reports a tracing message to notify the tracing server that a response is already returned to the M2 module;

(6) The M2 module returns a response message to the M1 module, and reports a tracing message; and (7) The M1 module returns a message to NE S, and reports a tracing message.

Supposing NE S, NE M and NE A set tracing conditions on a same interface, the interface may be used to set the tracing type, tracing duration and user number. Because NE S, NE M and NE A report tracing messages in different formats, different protocol plug-ins are provided to parse the reported tracing messages. The following describes the process of tracing services by using the method for devices tracing provided in an embodiment of the present invention.

A VOD service is defined in the system for devices tracing provided in an embodiment of the present invention. The VOD service involves NE S, NE M (including an M1 module and an M2 module) and NE A.

A standard process template for the VOD service is defined according to the foregoing scenarios, as shown in Table 1:

TABLE 1

Standard process template for the VOD service

| SN | Reporter | Sender | Receiver |
|---|---|---|---|
| 1 | S | S | M(M1) |
| 2 | M(M1) | M(M1) | M(M2) |
| 3 | M(M2) | M(M2) | M(M2) |
| 4 | M(M2) | M(M2) | A |
| 5 | A | A | M(M2) |
| 6 | M(M2) | M(M2) | M(M1) |
| 7 | M(M1) | M(M1) | S |

The user selects a service tracing mode and a VOD service to create a tracing task.

Search for interface plug-ins of the VOD service, and display an interface. The user sets the specific tracing condition information in the interface.

The NE information involved in the VOD service is searched for, and a command for creating a tracing task is sent to NE S, NE M and NE A.

After receiving the command for creating a tracing task, NE S, NE M and NE A turn on the tracing switch, and prepare for reporting tracing messages.

The VOD user performs VOD operations. After sending a request message to the M1 module, NE S reports a normal tracing message.

After receiving the reported tracing message from NE S, the tracing management module calls a processing unit that corresponds to NE S (a protocol plug-in that corresponds to NE S in this embodiment) to parse the tracing message. According to the specific parsing process described in the foregoing scheme, the information of the sender and receiver of the tracing message, message level, specific tracing contents and remarks are stored in a unified internal data structure of the unified tracing management system provided by an embodiment of the invention, and the presentation interface is notified to display the message. Because the tracing message is normal, the tracing message is displayed in black in the table display area of the interface.

After receiving the request message from NE S, the M1 module sends a notification message to the M2 module, and reports a normal tracing message (the level is determined by the message analysis module) to the tracing management module due to normal processing.

After receiving the reported tracing message from the M1 module, the tracing management module calls a processing unit that corresponds to NE M (a protocol plug-in in this embodiment) to parse the tracing message. The specific parsing process is the same as that mentioned above. Because the tracing message reported by the M1 module and the tracing message reported by NE S belong to a same tracing task, this message is displayed in the same interface by the interface presentation module. This message is also displayed in black in the table area of the interface.

After receiving the notification message from the M1 module, the M2 module performs internal processing. During processing, the M2 module finds that the system is overloaded and the VOD processing cannot be continued. The M2 module reports an alarm tracing message to notify the tracing management module of overload conditions.

The tracing management module receives the message from the M2 module, and calls the protocol plug-in that corresponds to NE M to parse the message. The interface presentation module displays the message in the same interface. Because the message is an alarm message, the interface presentation module displays the message in yellow in the table display area to remind the user to pay attention to the message.

After the message is parsed, the system analyzes the process, and compares all the reported tracing messages with those in the standard process. Because the reported three tracing messages are different from those in the standard process, these messages are displayed in red in the graph display area of the interface.

Due to system overload, the M2 module stops sending messages to NE A. The VOD service process ends.

The VOD user attempts to perform VOD operations twice, and the process is also terminated at the M2 module.

It can be seen by a tracing system user (also maintenance personnel) that the tracing process is always terminated after the M2 module performs internal processing and that no request message is subsequently sent to NE A. The user may directly determine that the M2 module fails. The user may find out specific failure causes by viewing the tracing messages in the table display area. Because the interface presentation module displays the alarm tracing messages that are reported by the M2 module in a warning color in the table display area of the interface, the user may focus on only these alarm messages to obtain failure causes through specific contents and remarks and take measures to handle the failures.

So far, the locations and causes of failures are found out, and the tracing system user deletes the tracing task. The tracing ends.

It can be seen from the foregoing embodiments of the invention that the method for devices tracing based on the foregoing system does not need to trace NE S, NE M or NE A separately, and may locate failures and causes directly by tracing only once, thus speeding up the troubleshooting.

Although the invention has been described through some exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A system for devices tracing, comprising multiple devices that are connected in a network, a tracing management module that is connected to the multiple devices, and a configuration management module that is connected to the tracing management module and an interface presentation module that is connected to the tracing management module and the configuration management module, wherein:

the configuration management module is configured to store and maintain tracing configuration information, wherein the tracing configuration information comprises available tracing functions, specific device types and tracing parameters information that each of the devices supports; and the interface presentation module is configured to query tracing configuration information according to received user commands, display a customizing interface, receive a tracing type setting command and tracing condition information specified by a user through the customizing interface, and send the received tracing type setting command and tracing condition information to the tracing management module;

the tracing management module is configured to determine different devices involved in a tracing task according to the received tracing type setting command and tracing condition information, send tracing control commands to each of the different devices, receive tracing messages from the each of the different devices, and perform crossnetwork element (NE) tracing.

2. The system of claim 1, further comprising a processing unit management module that is connected to the tracing management module, wherein:

the processing unit management module is configured to store processing unit of each device; and wherein the process unit of each device is configured to encode the tracing control commands and parse the tracing messages by using the processing unit according to call commands of the tracing management module, implemented by using plug-in.

3. The system of claim 1, further comprising a message analysis module that is connected to the tracing management module, wherein the message analysis module is configured to compare the tracing messages from the tracing management module received tracing messages with the standard service process and analyze the level of the tracing messages to locate the device failures and failure causes.

4. The system of claim 1, further comprising an interface processing unit that is connected to the interface presentation module, wherein the interface processing unit is adapted to display interfaces according to call commands from the interface presentation module.

5. A method for devices tracing, comprising:

querying, by an interface presentation module, tracing configuration information stored and maintained in the configuration management module according to the user commands, wherein the tracing configuration information comprises available tracing functions, specific device type and tracing parameter information that each of the devices connected in a network supports;

displaying, by the interface presentation module, a customizing interface;

receiving, by the interface presentation module, a tracing type setting command and tracing condition information specified by a user through the customizing interface;

sending, by the interface presentation module, the tracing type setting command and tracing condition information to a tracing management module;

determining, by the tracing management module, different devices involved in a tracing task according to the tracing type setting command and the tracing condition information;

sending a command for creating a tracing task to each of the different devices; and receiving tracing messages reported by the each of the different devices, and obtaining tracing results.

6. The system of claim 1, wherein the interface presentation module displays the tracing results in at least one of a graph display area, a text display area, a table display area, a tree-type display area, and a code stream display area.

7. The system of claim 6, wherein the graph display area shows the tracing results in a flowchart.

8. The system of claim 6, wherein the table display area shows public information of the tracing results, the public information comprises reporting time, sender, receiver, level and brief description of the tracing messages.

9. The system of claim 6, wherein tree-type display area shows the detailed information of the tracing messages in a tree, and wherein the code stream display area shows original code streams of the tracing messages.

10. The system of claim 1, wherein the multiple devices comprises at least one of the following: a service gateway, a streaming server, and a charging server.

11. The method of claim 5, wherein after receiving the tracing messages reported by each device and obtaining the tracing results, the method further comprises:

displaying the tracing results; and deleting the tracing task according to a tracing task deletion command.

12. The method of claim 5, wherein before sending the command for creating a tracing task to each of the different devices, the method further comprises:

encoding the command for creating a tracing task according to the different tracing protocols; and sending the encoded command for creating a tracing task to each of the different devices.

13. The method of claim 5, wherein the step of obtaining tracing results comprises: parsing the tracing messages and obtaining tracing results.

14. The method of claim 5, wherein before receiving the tracing task information and determining different devices involved in the tracing task according to the tracing task information, the method further comprises:

obtaining and storing standard service process information; and the step of receiving the tracing messages reported by each device and obtaining tracing results comprises:

receiving the tracing messages reported by each of the different devices;

analyzing the tracing messages; and comparing the analyzed task result messages with the standard service process information, and obtaining tracing results.

15. The method of claim 14, wherein the step of parsing the tracing messages and obtaining the tracing results after receiving the tracing messages reported by each device comprises:

parsing the tracing messages reported by each device;

analyzing the parsed tracing messages; and comparing the analyzed task result messages with the standard service process information, and obtaining tracing results.

* * * * *